United States Patent [19]

Watanabe

[11] Patent Number: 4,734,685

[45] Date of Patent: Mar. 29, 1988

[54] POSITION CONTROL APPARATUS

[75] Inventor: Yasuhiro Watanabe, Yokohama, Japan

[73] Assignee: Canon Kabushiki Kaisha, Tokyo, Japan

[21] Appl. No.: 632,025

[22] Filed: Jul. 18, 1984

[30] Foreign Application Priority Data

Jul. 28, 1983 [JP] Japan ................................ 58-136723

[51] Int. Cl.[4] ............................................. G09G 1/00
[52] U.S. Cl. .................................. 340/710; 340/706; 178/18
[58] Field of Search ............... 340/710, 712, 706, 709, 340/723, 724, 726, 707; 178/18, 19, 20

[56] References Cited

U.S. PATENT DOCUMENTS

| 4,069,511 | 1/1978 | Lelke | 340/709 |
|---|---|---|---|
| 4,313,113 | 1/1982 | Thornburg | 178/18 |
| 4,386,410 | 5/1983 | Pandya et al. | 340/726 |
| 4,390,873 | 6/1983 | Kirsch | 178/18 |
| 4,464,652 | 8/1984 | Lapson et al. | 340/710 |
| 4,500,876 | 2/1985 | English et al. | 340/709 |
| 4,521,772 | 6/1985 | Lyon | 340/794 |
| 4,549,173 | 10/1985 | Nakamura | 340/706 |
| 4,563,740 | 1/1986 | Blake et al. | 340/709 |

OTHER PUBLICATIONS

Williams, G., "The Lisa Computer System", *Byte*, Feb. 1983, pp. 33–50.

*Primary Examiner*—Marshall M. Curtis
*Assistant Examiner*—Mahmoud Fatahi-Yar
*Attorney, Agent, or Firm*—Fitzpatrick, Cella, Harper & Scinto

[57] ABSTRACT

A position control apparatus comprises a pointing device for pointing a position, a microprocessor for computing a distance of movement and a velocity of movement of the pointing device controls moving the position pointed by the pointing device at a velocity corresponding to the velocity detected when the distance of movement and the velocity of movement detected exceed predetermined values.

17 Claims, 8 Drawing Figures

POSITION CONTROL APPARATUS

BACKGROUND OF THE INVENTION

1. Field of the Invention

The present invention relates to an image display device, and more particularly to an image display device which can reference an entire image larger than a display screen by a panning operation.

2. Description of the Prior Art

In a prior art image display device, when an image larger than a display screen is to be referenced, one of several methods is used. In one method, the image is displayed in a reduced scale. It is suitable to observe the entire image but a detail of the image cannot be observed. In another method, a display area of the image is shifted to scan the entire image. This is called a panning operation. In the prior art device, the image scan is instructed by a conventional keyboard. Accordingly, the image scan by an intuitive motion of an operator while he/she watches the screen cannot be attained.

SUMMARY OF THE INVENTION

It is an object of the present invention to provide an image display device which enables an image scan by an intuitive motion of an operator by instructing a panning operation by a pointing device (PD).

It is another object of the present invention to provide an image display device which enhances an efficiency of a large scale image information retrieval.

It is another object of the present invention to provide a position control apparatus comprising:

a pointing device for pointing a position;

detection means for detecting a distance of movement and a velocity of movement of the pointing device; and control means for moving the position pointed by the pointing device at a velocity corresponding to the velocity detected by the detection means when the distance of movement and the velocity detected by the detection means exceed predetermined values.

It is another object of the present invention to provide a position control apparatus comprising:

a pointing device for pointing a position;

detection means for detecting a direction of movement and a velocity of movement of said pointing device; and control means for moving the position pointed by the pointing device in a direction and at a velocity corresponding to the direction of movement and the velocity of movement detected by the detection means.

It is another object of the present invention to provide a position control apparatus comprising:

a pointing device for pointing a position;

detection means for detecting a direction of movement and a velocity of movement of said pointing device; and control means for changing a velocity of movement to position pointed by the pointing device when the direction of movement of the pointing device detected by detection means is in a predetermined direction.

It is another object of the present invention to provide a position control apparatus comprising:

a pointing device for pointing a position;

detection means for detecting a direction of movement and a velocity of movement of the pointing device; and moving means for moving the position pointed by the pointing device in accordance with the direction of movement and the velocity of movement of the pointing device detected by the detection means when the direction of movement of the pointing device detected by the detection means is in a predetermined direction.

DETAILED DESCRIPTION OF THE PREFERRED EMBODIMENT

Figure 1:
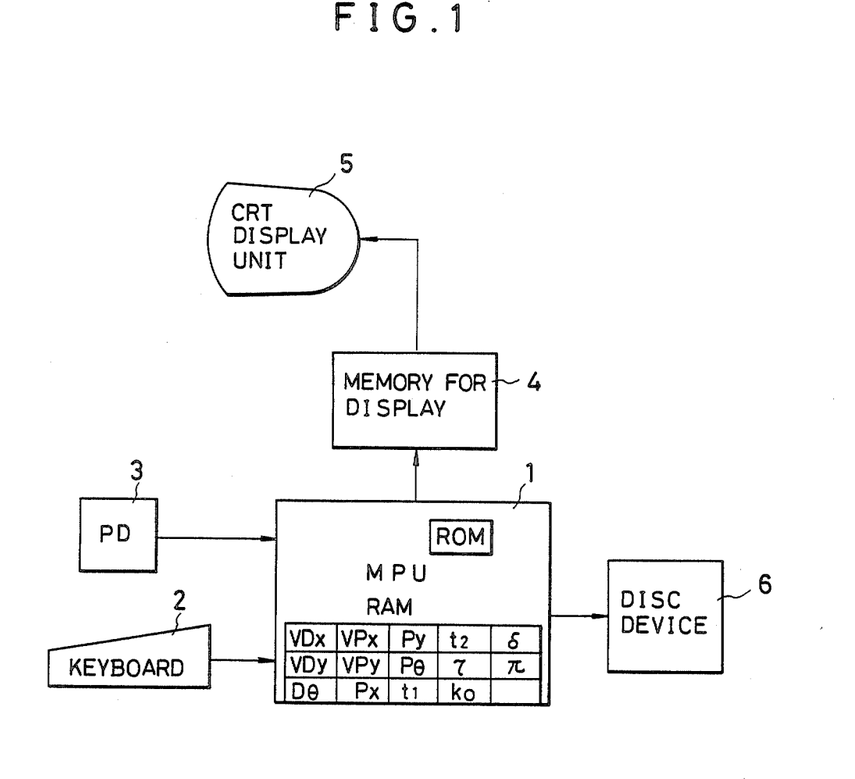
FIG. 1 is a block diagram of one embodiment of an image display device of the present invention.

FIG. 1 shows a block diagram of a configuration of one embodiment of the image display device of the present invention. In FIG. 1, numeral 1 denotes a microprocessing unit (MPU) which contains a RAM and a ROM. It processes general purpose information and controls panning display of an image. The RAM has registers $VD_x$, $VD_y$, $D_\theta$, $VP_x$, $VP_y$, $P_x$, $P_y$, $P_\theta$, $t_1$, $t_2$, $\tau$, $k_0$, $\delta$ and $\pi$ for storing constants and parameters used in the control to be described later. The ROM stores a program for a control procedure to be described later. Numeral 2 denotes a keyboard, numeral 3 denotes a pointing device (PD) which is commonly called a mouse, numeral 6 denotes a disc in which an image information is filed, numeral 4 denotes a display memory which one screen of image, and numeral 5 denotes a raster scan type CRT display which displays a portion of the image of the display memory 4.

Figure 2:
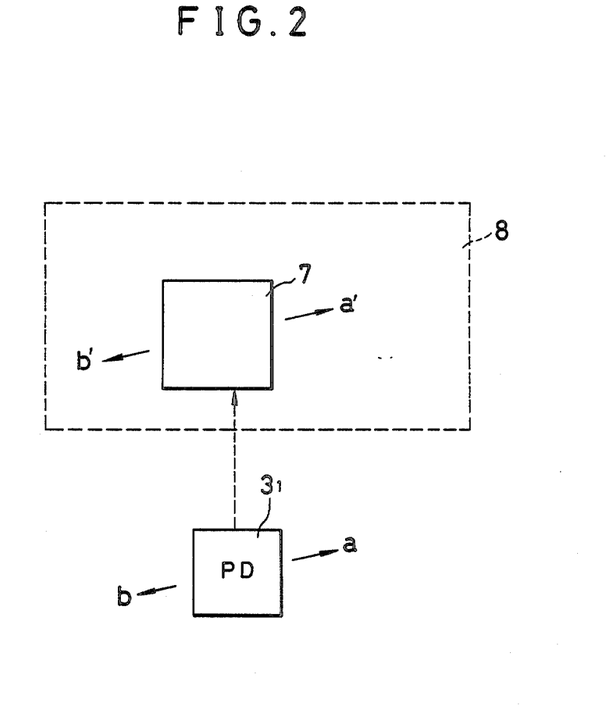
FIG. 2 is a conceptional view of a panning operation.

FIG. 2 shows a conceptional view of a panning display operation of an image larger than a display screen. Numeral 8 denotes one screen of image stored in the display memory 4, and a portion thereof is read out as a display region 7 and displayed on the CRT screen 5.

If an operator roughly moves an actuation portion $3_1$ of the PD 3 in a direction of an arrow a or b, the display region 7 starts to be moved in a direction a' or b'. The direction of movement and a velocity of movement of the actuation portion $3_1$ may be arbitrarily selected and the movement of the display region 7 follows to them. In order to stop the movement of the display region, the operator roughly moves the actuation portion $3_1$ in the opposite direction at substantially the same velocity. If the direction of movement of the actuation portion is not in the opposite direction, only the direction of movement of the display region is changed. If the actuation portion is moved in the opposite direction at a low velocity, the velocity of movement of the display region is reduced, and if the velocity of movement of the actuation portion is high, the display region starts to be moved in the opposite direction. In this manner, the display region starts to be moved in accordance with an intuitive motion of an operator while he/she watches the screen and the movement continues unless no further motion is applied. Accordingly the operator can subsequently concentrates his/her attention to the screen. The movable range of the actuation portion is not limited by a scannable range of the screen.

Figure 3A:
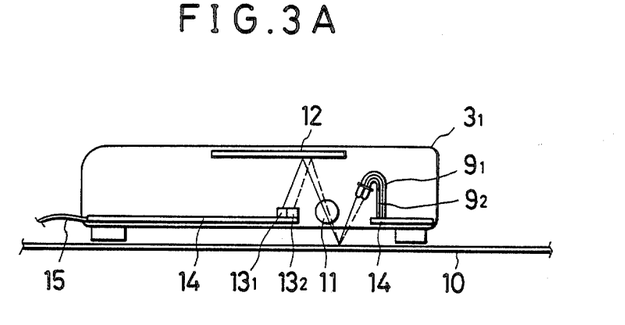
FIG. 3A is a sectional view of a pointing device.
Figure 3B:
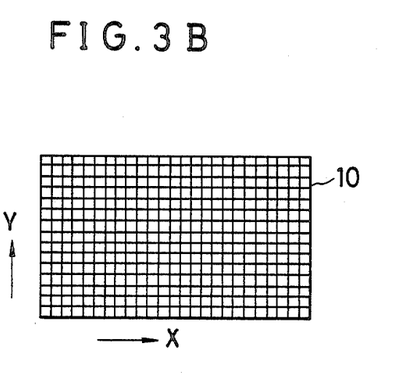
FIG. 3B is a top view of a pad of the pointing device.

FIG. 3A shows a sectional view of the PD 3. Two light sources (LEDs) $9_1$ and $9_2$ having different wavelengths are provided and light emitted therefrom are reflected by a surface of an underlying pad 10. The reflected lights are condensed by a spherical lens 11 and reflected by a reflection mirror 12 and detected by photodetectors $13_1$ and $13_2$. A grid pattern as shown in FIG. 3B is drawn on the surface of the pad 10. The vertical and horizontal lines are printed in such colors that they alternatively reflect the lights from the light sources $9_1$ and $9_2$, respectively. Accordingly, as the actuation portion $3_1$ is moved on the pad 10, the crossing of the light across the vertical and horizontal lines is detected. By detecting the edges of the vertical and horizontal lines and counting them, the distance of movement of the actuation portion $3_1$ can be detected. The vertical and horizontal directions are determined by detecting light spots at two points by the photodetectors $13_1$ and $13_2$ and by the sequence of detection of edges at those two points. Numeral 14 denotes a substrate on which the parts and the processing circuit are mounted, and numeral 15 denotes a cable for connection to the MPU 1.

Such a pointing device is commercially available. For example, it may be an optical mouse marketed by Mouse Systems Corporation of the U.S.A. In some device, when the actuation portion $3_1$ is moved to the right along an x-axis of the pad 10, a $+\Delta x$ signal is produced each time it is moved by a predetermined distance, and a $-\Delta x$ signal is produced when it is moved to the left. The same is true for a y-axis movement. Accordingly, a diagonal movement can be determined by externally combining the x-axis and y-axis output signals. In the present embodiment, the movement of the display region is indicated by the PD of the type descirbed above.

Figure 4A:
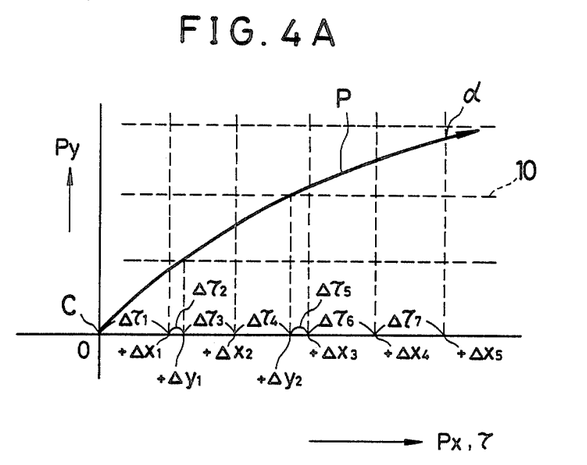
FIGS. 4A and 4B illustrate a principle of operation of panning control in the embodiment.
Figure 4B:
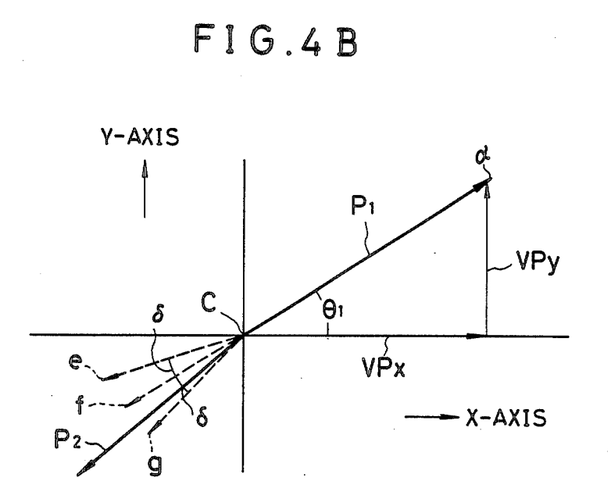

FIGS. 4A and 4B are conceptual views for explaining a principle of operation of the panning control in the present embodiment. FIG. 4A shows a locus P traced when the actuation portion $3_1$ is moved on the pad 10 from a point $\leq$ toward a point d. When the actuation portion $3_1$ is moved at a velocity higher than a predetermined velocity, the subsequent movement is monitored by the distance registers $P_x$ and $P_y$ and the elapsed time register $\tau$. A start point therefor is shown by a point c, and the contents of the registers at this moment are "0". As the actuation portion $3_1$ is further moved toward a point d, a signal $\Delta x$ or $\Delta y$ is produced each time the actuation portion $3_1$ is moved along the x-axis or y-axis by a predetermined distance. Since the movement locus P is directed to right top in FIG. 4A, signals $+\Delta x_1$, $+\Delta y_1$, $+\Delta x_2$, ..., $+\Delta x_5$ are produced in sequence along the time axis $\tau$. If the movement is in the opposite direction, signals $-\Delta x_1$, $-\Delta y_1$, $-\Delta x_2$, ... $-\Delta x_5$ are produced in sequence. The MPU 1 monitors those signals, accumulates them in the registers $P_x$ and $P_y$ and also accumulates times $\Delta \tau_1 - \Delta \tau_7$. As the actuation portion $3_1$ finally reaches the point d and the distance of movement $\sqrt{Px^2 + Py^2}$ exceeds a predetermined distance the MPU 1 calculates the direction of locus P of movement and the velocity of movement.

FIG. 4B shows a relation between the direction of movement and the velocity of movement. Average velocities of movement along the x-axis and the y-axis are calculated by $VP_x = P_x/\tau$ and $VP_y = P_y/\tau$ based on the contents of the registers $P_x$ and $P_y$. An angle $\theta_1$ of a linearly approximated velocity vector $P_1$ is calculated by $\tan^{-1} P_y/P_x$. The MPU 1 controls the movement of the display region in accordance with the velocities of movement $VP_x$ and $VP_y$.

The panning control procedure in the embodiment is explained with reference to flow charts of FIGS. 5 and 6.

Figure 5:
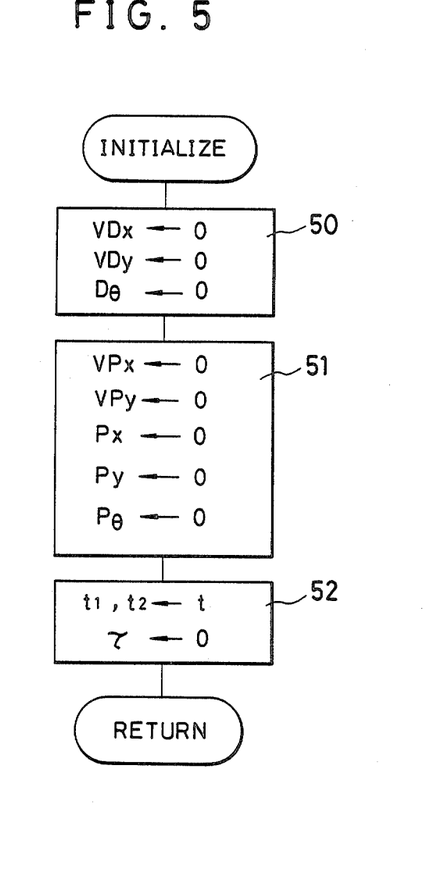
FIG. 5 is a flow chart showing an initialization procedure.

FIG. 5 is a flow chart showing an initialization procedure of the device. In a step 50, information on the movement of the display region is initialized. $VD_x$ and $VD_y$ denote registers for holding the velocities of movement of the display region along the x-axis and y-axis, and $D_\theta$ denotes a register for holding the direction of movement. In a step 51, information on the movement of the actuation portion is initialized. $VP_x$ and $VP_y$ denote registers for holding the velocities of movement of the actuation portion $3_1$ along the x-axis and y-axis, $P_x$ and $P_y$ denote registers for accumulating distances of movement, and $P_\theta$ denotes a register for calculating and holding the direction of movement. In a step 52, time information on the movement of the actuation portion $3_1$ is initialized. A symbol $t_2$ denotes a register for holding a current time, $t_1$ denotes a register for holding an immediately previous time, and $\tau$ denotes a register for accumulating a movement elapsed time. The time information t is supplied by a real time clock contained in the MPU 1. In the step 52, both the registers $t_2$ and $t_1$ are initialized by the current time t. The register $\tau$ is initialized to "0". Those registers are provided on the RAM of the MPU 1.

Figure 6:
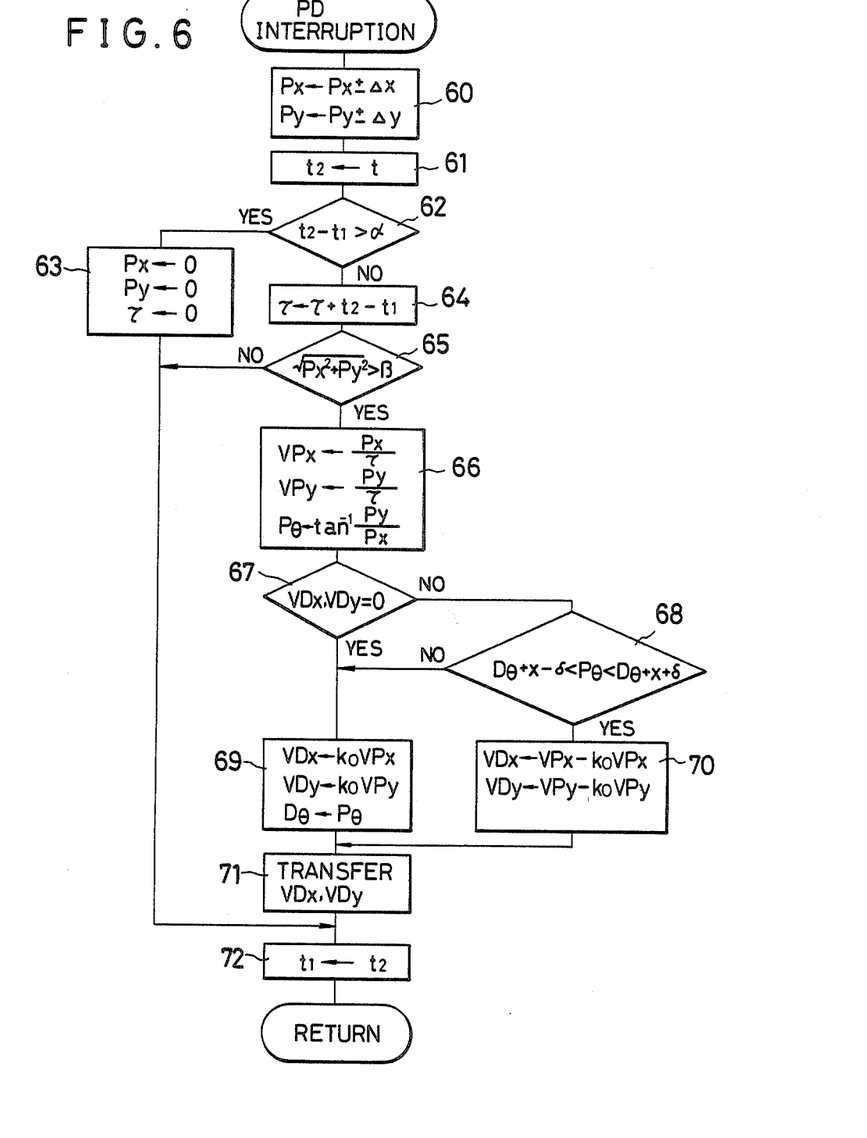
FIG. 6 is a flow chart showing an operation procedure for movement instruction information by an activator portion.

FIG. 6 shows a flow chart of an operation procedure for the movement information by the actuation portion. The process jumps to this flow each time the PD 3 produces the output signal $\mp \Delta x$ or $\mp \Delta y$. In a step 60, the content of the register $P_x$ or $P_y$ is updated depending on the content of interruption. In a step 61, the current time t is read into the register $t_2$. In a step 62, it is checked if $t_2 - t_1 > \alpha$. If the decision is YES, it indicates that an interval of the interruption input is larger than the predetermined length $\alpha$ and the velocities of the actuation portion $3_1$ along the x-axis and the y-axis have not yet reached sufficient velocities. In a step 63, the contents of the registers Px, $P_y$ and $\tau$ are initialized to "0". Thus, an origin of coordinates for the analysis of the movement of the actuation point is relatively moved on the sheet 10. Next, in a step 72, the content of the register $t_2$ is transferred to the register $t_1$. If the decision in step 62 is NO, it indicates that the actuation portion $3_1$ is moving at a significant velocity. In a step 64, accumulation is done by the register $\tau$. In a step 65, it is checked if the distance of movement of the actuation portion has exceeded a predetermined length $\beta$. If the decision is NO, it indicates that the movement sufficient for the recognition of the direction of movement intended by the operator has not yet been made, and the process goes to a step 72. In the step 72, the register $t_1$ is updated in a similar manner.

The above operation is repeated and if the movement is made by a distance larger than the predetermined length $\beta$ at a velocity higher than the predetermined velocity $\alpha$, the decision in the step 65 becomes YES and the process goes to a step 66. In the step 66, the velocities of movement $VP_x$ and $VP_y$ of the actuation portion $3_1$ along the x-axis and the y-axis are calculated. The velocity of the movement of the display region, expected by the operator is calculated. The expected direction of movement is contained in the contents of the $VP_x$ and $VP_y$. In the present embodiment, the current direction of movement $P_\theta$ is determined for the comparison of new and old directions of movement but general direction of movement is held by information indicating quadrants of the coordinates. A first quadrant is represented by $P_x>0$ and $P_y>0$, a second quadrant is represented by $P_x<0$ and $P_y<0$, a third quadrant is represented by $P_x<0$ and $P_y<0$, and a fourth quadrant is represented by $P_x>0$ and $P_y<0$. The information of $P_x=0$ or $P_y=0$ is also processed. An angle $\theta_1$ is calculated by $\theta_1=\tan^{-1}|P_y|/|P_x|$ and it is stored in $P_\theta$. In a step 67, it is checked if $VD_x$ and $VD_y$ are "0". For example, in the initialization state of the device, both $VD_x$ and $VD_y$ are "0" because the display region has not yet been moved. If the display region is stationary, the decision is YES and the process goes to a step 69. In the step 69, the velocity of movement of the display region is calculated. It is calculated by multiplying a proportional constant k to the contents of the registers $VP_x$ and $VP_y$. It is advantageous that the velocity of movement of the display region is lower than the velocity of movement of the actuation portion. Accordingly, the constant k is selected to $2^{-n}$ (n=1, 2, 3, . . . ). The content of the register $P_\theta$ is held in the register $D_\theta$ in order to store the current direction of movement. In a step 71, the contents of $VD_x$ and $VD_y$ are transferred to a process routine in which the image data of the display region is read out from the display memory 4. In a step 72, the register $t_1$ is updated. On the other hand, in the readout routine, the read location of the display memory 4 is updated in accordance with the contents of $VD_x$ and $VD_y$. In the present embodiment, it is updated each time one screen of image is displayed. The larger the contents of $VD_x$ and $VD_y$ are, the faster the display region is moved. The direction of movement is determined by the combination of the signals of the contents of $VD_x$ and $VD_y$. The movement of the display region continues with same data until the contents of $VD_x$ and $VD_y$ are next updated.

If the decision in the step 67 is NO, the process goes to a step 68. Once the display region is moved, the subsequent decision calls for a step 68 unless the display region is stopped. In the step 68, it is checked if the information indicating the new direction of movement is in a predetermined range or not.

For example, let us assume that the operator stops the actuation near the point d in FIG. 4A and starts the actuation in a different direction. In this case, the contents of $P_x$, $P_y$ and $\tau$ are initialized in the step 63 and the decision of the step 67 is made after the actuation portion has been moved at an appropriate velocity by an appropriate distance. Since the display region is continuously moved, the decision is NO and the process goes to the step 68. In the step 68, it is checked if the new direction of movement is within a range encircled by broken lines ecg in FIG. 4B.

Assuming that the movement is along the line $P_2$ and the distances of movement along the x-axis and the y-axis are $P_{x2}$ and $P_{y2}$, they are both negative and line in the third quadrant. In this manner, a rough determination of the range can be made in a short time. The comparison to be described later may be made only when it is required. Since $D_\theta$ holds the information on the direction for the previous $P_1$, if it is in the third quadrant, it is compared with the information on the direction of $P_2$.

If the decision is YES, the process goes to a step 70 where the new velocity of movement is subtracted from the current velocity of movement of the display region. As a result, the subsequent velocity of movement of the display region is reduced and maintained at the reduced velocity. If the velocities of movement of $P_1$ and $P_2$ are equal, the movement of the display region is stopped. It may be stopped over several times. In this manner, the operator can control the movement of the display region while he/she watches the screen.

If the decision in the step 68 is beyond the range, the process goes to a step 69 where the velocity of movement of the display region is replaced by the new velocity of movement. Thus, the direction and the velocity of movement of the display region are updated in accordance with the new movement of the actuation portion $3_1$. The operator may move the actuation portion $3_1$ to the vicinity of the point d in FIG. 4A and then move it in a different direction with a certain degree of speed. This frequently occurs in an actual operation and it is effective in that the direction of movement is corrected during the operation. Once the movement of the display region is started the decision in the step 67 is always NO and the decision in the step 68 is also NO unless the direction of movement of the actuation portion is significantly changed (opposite direction). Accordingly, the process follows the flow of the chart and the velocities of movement $VP_x$ and $VP_y$ change in average so that the movement of the display region generally follows it.

As described hereinabove, in accordance with the present invention, when a large image is to be referenced by a small display screen, the whole image can be scanned by the intuitive motion of the operator so that detailed information of the large image can be efficiently referenced without loss.

What is claimed is:

1. A position control apparatus comprising:
   first storage means for storing display information;
   a pointing device for identifying for display a portion of the display information stored in said first storage means by moving freely on a plane;
   detection means for detecting a vector of movement of said pointing device;
   calculation means for calculating a velocity of movement from the vector of movement detected by said detection means;
   discrimination means, responsive to at least one parameter of said vector, for discriminating whether the vector of movement of said pointing device detected by said detection means is indicative of a valid direction of movement thereof;
   second storage means for storing the velocity of movement calculated by said calculation means when said discrimination means discriminates that the direction of movement can be determined from said vector of movement; and
   control means for moving the portion identified for display at a velocity corresponding to the velocity stored in said second storage means even when the movement of said pointing device is stopped.

2. A position control apparatus according to claim 1 further comprising:
   display means for displaying information;
   wherein said first storage means stores a quantity of display information larger than a quantity of information displayable by said display means; and
   wherein the portion identified for display by said pointing device is displayed on said display means.

3. A position control apparatus according to claim 1 wherein said detection means is of an optical type.

4. A position control apparatus comprising:
   first storage means for storing display information;

a pointing device for identifying for display a portion of the display information stored in said first storage means by moving freely on a plane;
detection means for detecting a distance of movement of said pointing device;
discrimination means, responsive to the distance of movement detected by said detecting means, for discriminating whether the distance of movement of said pointing device detected by said detection means is indicative of a valid direction of movement thereof;
calculation means for calculating a velocity of movement from the distance of movement of said pointing device detected by said detection means;
second storage means for storing the velocity of movement calculated by said calculation means; and
control means for moving the portion identified for display by said pointing device at a velocity corresponding to the velocity of movement stored in said second storage means even when the movement of said pointing device is stopped.

5. A position control apparatus according to claim 4 further comprising:
display means for displaying display information;
wherein said first storage means stores a quantity of display information larger than a quantity of information displayable by said display means; and
wherein the portion identified for display by said pointing device is displayed on said displayed means.

6. A position control apparatus according to claim 4 wherein said detection means is of an optical type.

7. A position control apparatus according to claim 4 wherein said control means changes the velocity and the direction of movement of the portion identified for display by said pointing device in accordance with the direction and the velocity of movement of said pointing device.

8. A position control apparatus comprising:
first storage means for storing display information;
a pointing device for identifying for display a portion of the display inforamtion stored in said storage means by moving freely on a plane;
detection means for detecting a distance of movement of said pointing device;
calculation means for calculating a velocity of movement from the distance of movement of said pointing device detected by said detection means;
discrimiantion means, responsive to the distance of movement detected by said detection means, for discriminating whether the distance of movement of said pointing device detected by said detection means is indicative of a valid direction of movement thereof;
second storage means for storing the velocity of movement calculatd by said calculation means;
first control means for moving the portion identified for display by said pointing device at a velocity corresponding to the velocity of movement stored in said second storage device even when the movement of said pointing device is stopped; and
second control means for changing the velocity of movement stored in said second storage means.

9. A position control apparatus according to claim 8 further comprising:
display means for displaying information;
wherein said first storage means stores a quantity of information larger than a quantity of information displayable by said display means; and
wherein the portion identified for display by said pointing device is displayed on said display means.

10. A position control apparatus according to claim 8 wherein said detection means is of an optical type.

11. A position control apparatus according to claim 8 wherein said second control means changes the velocity of movement of the portion identified for display when said pointing device moves in a direction different from a prior direction of movement by approximately 180 degrees.

12. A position control apparatus according to claim 8 wherein said second control means vectorially adds a velocity corresponding to the velocity of movement of said pointing device detected by said detection means to a previously detected velocity of movement of said pointing device.

13. A position control apparatus comprising:
storage means for storing display information;
a pointing device for identifying for display a portion of the display information by moving on a plane;
detection means for detecting a vector of movement of said pointing device;
discrimination means, responsive to at least one parameter of said vector, for discriminating whether the vector of movement of said pointing device detected by said detection means is indicative of a valid direction of movement thereof;
moving means for moving the portion identified for display by said pointing device in accordance with the direction of the vector of movement detcted by said detection means even when the movement of said pointing device is stopped; and
control means for stopping the movement of the portion identified for display by said moving means when said detection means detects a vector of movement having a substantially opposite direction to that of said vector of movement.

14. A position control apparatus according to claim 13 further comprising:
display means for displaying information;
wherein said storage means stores a quantity of information larger than a quantity of information displayable by said display means; and
wherein the portion identified for display by said pointing device is displayed on said display means.

15. A position control apparatus according to claim 13 wherein said detection means is of an optical type.

16. A position control apparatus according to claim 13 wherein said control means changes the velocity of movement of the portion identified for display when said pointing device moves in a direction different by approximately 180 degrees from a prior direction of movement.

17. A position control apparatus according to claim 13 wherein said control means moves the portion identified by said pointing device in accordance with changes in the direction and the velocity of movement of said pointing device detected by said detection means.

* * * * *

UNITED STATES PATENT AND TRADEMARK OFFICE
CERTIFICATE OF CORRECTION

PATENT NO. : 4,734,685

DATED : March 29, 1988

INVENTOR(S) : WATANABE

Page 1 of 3

It is certified that error appears in the above-identified patent and that said Letters Patent is hereby corrected as shown below:

COLUMN 1

Line 30, "large scale" should read --large-scale--.

COLUMN 2

Line 8, "invention; FIG.2" should read
        --invention;
            FIG. 2--.
    Line 9, "conceptional" should read --conceptual--.
    Line 15, "and FIG. 6" should read
        --and
            --FIG. 6--.
    Line 36, "which" should read --with--.
    Line 39, "conceptional" should read --conceptual--.
    Line 49, delete "to".
    Line 66, "concentrates" should read --concentrate--;
        and "to" should read --on--.

UNITED STATES PATENT AND TRADEMARK OFFICE
CERTIFICATE OF CORRECTION

PATENT NO. : 4,734,685

DATED : March 29, 1988

INVENTOR(S) : WATANABE

It is certified that error appears in the above-identified patent and that said Letters Patent is hereby corrected as shown below:

COLUMN 3

Line 3, "light" should read --lights--.
    Line 36, "scirbed" should read --scribed--.
    Line 41, delete "$\leq$".

COLUMN 4

Line 24, "real time" should read --real-time--.

COLUMN 5

Line 4, "$P_x < 0$ and $P_y < 0$" should read
        --$P_x < 0$ and $P_y < 0$,--.
    Line 16, "to" should read --by--.
    Line 56, "line" should read --lie--.

COLUMN 7

Line 30, "said displayed" should read
        --said display--.
    Line 44, "inforamtion" should read --information--; and
        "said storage" should read
        --said first storage--.

UNITED STATES PATENT AND TRADEMARK OFFICE
CERTIFICATE OF CORRECTION

PATENT NO. : 4,734,685

DATED : March 29, 1988

INVENTOR(S) : WATANABE

Page 3 of 3

It is certified that error appears in the above-identified patent and that said Letters Patent is hereby corrected as shown below:

Line 51, "discrimiantion" should read --discrimination--.

Line 58, "calculatd" should read --calculated--.

COLUMN 8

Line 36, "detcted" should read --detected--.

Signed and Sealed this

First Day of November, 1988

Attest:

DONALD J. QUIGG

Attesting Officer

Commissioner of Patents and Trademarks